June 27, 1967 E. BYCZKOWSKI ETAL 3,328,079
RECLINING SEAT
Filed Nov. 24, 1965
3 Sheets-Sheet 1

INVENTOR.
ERNEST BYCZKOWSKI
HENRY J. TISCHLER
BY
Barnes, Kisselle, Raisch & Choate
ATTORNEYS

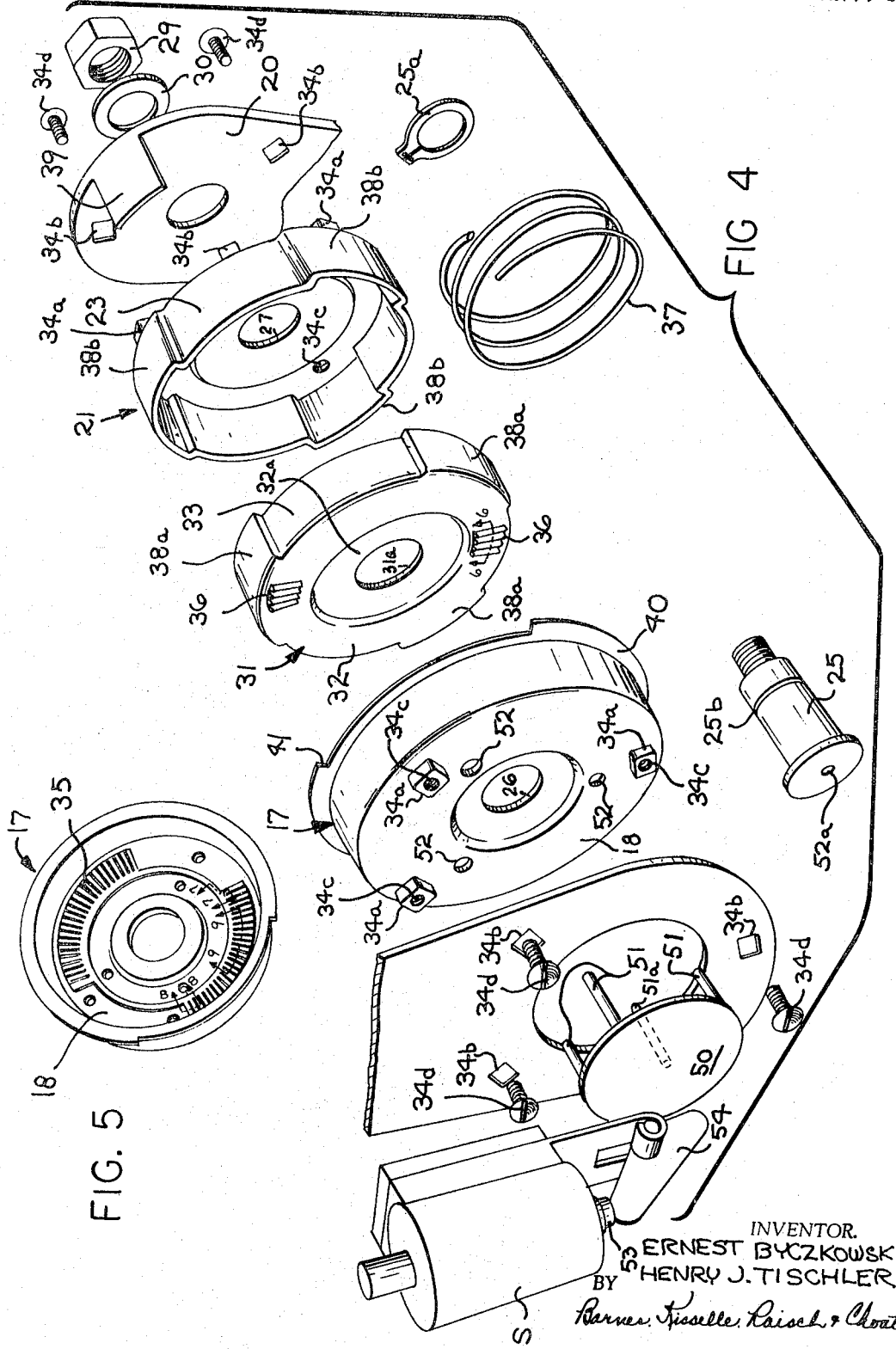

June 27, 1967   E. BYCZKOWSKI ET AL   3,328,079
RECLINING SEAT
Filed Nov. 24, 1965   3 Sheets-Sheet 3

INVENTOR.
ERNEST BYCZKOWSKI
BY HENRY J. TISCHLER

ATTORNEYS

United States Patent Office 3,328,079
Patented June 27, 1967

3,328,079
RECLINING SEAT
Ernest Byczkowski, Detroit, and Henry J. Tischler, Bloomfield Hills, Mich., assignors to Young Spring & Wire Corporation, Detroit, Mich., a corporation of Michigan
Filed Nov. 24, 1965, Ser. No. 509,549
13 Claims. (Cl. 297—373)

This invention relates to reclining seats and particularly to reclining seats for use with automobiles.

It is an object of this invention to provide a reclining seat construction wherein the angular position of the seat can be readily adjusted; which incorporates a seat adjusting mechanism that is relatively simple and low in cost; which incorporates such a mechanism that can be made of sheet metal; and which is readily adaptable to function in two-door and four-door vehicles.

In the drawings:

FIG. 4 is an exploded perspective view of the mechanism shown in FIGS. 2 and 3.

FIG. 5 is a perspective view of a portion of the mechanism shown in FIGS. 2–4.

Figure 1:
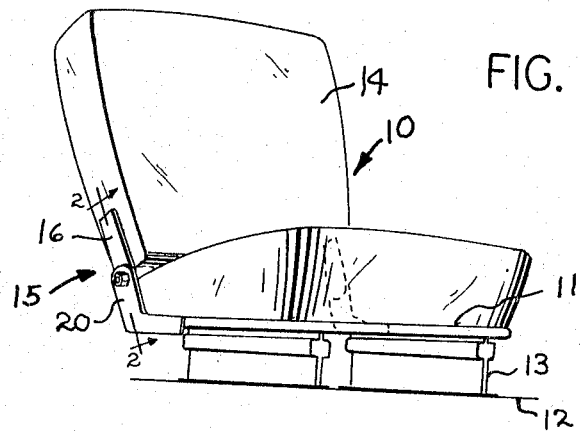
FIG. 1 is a perspective view of a seat embodying the invention.

Referring to the drawings, the invention is adapted to be utilized in connection with a seat 10 which has a base 11 mounted for horizontal adjustment on the floor 12 of an automotive vehicle by seat tracks 13. A seat back 14 is hinged at one end by a pin engaging an opening in the base 11 in accordance with well-known conventional construction. At its other end, the seat back 14 is pivoted to the seat base 11 by a mechanism 15 which holds the seat back 14 in predetermined angular relation to the seat base 11.

Figures 2, 3:
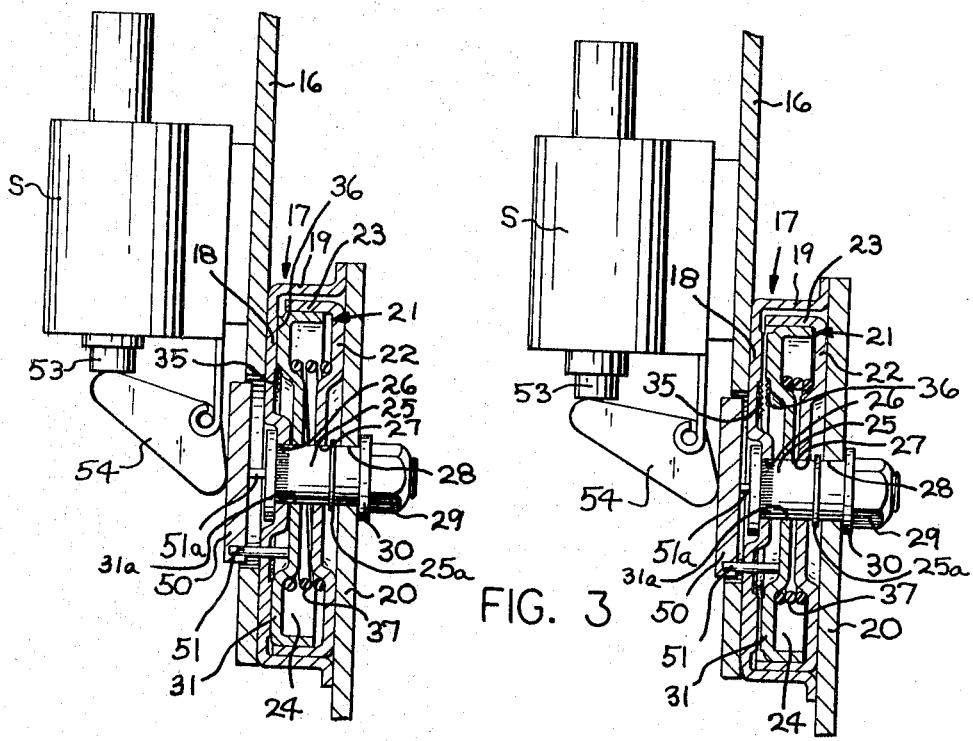
FIG. 2 is a sectional view on an enlarged scale taken along the line 2—2 in FIG. 1.
FIG. 3 is a sectional view similar to FIG. 2 showing the parts in a different operative position.

Referring to FIGS. 2, 4 and 5, the mechanism 15 includes an integral flat plate 16 on seat back 14 on which an outer sheet metal casing member 17 is mounted. Casing member 17 includes a substantially flat portion 18, a cylindrical flange portion 19 and a flat peripheral flange 40. The seat base 11 includes an upright plate 20 on which a second sheet metal casing member 21 is mounted. Casing member 21 includes an annular portion 22 and a cylindrical flange portion 23 that telescopes within the flange portion 19 of the first casing member 17. By this arrangement, the casing members 17, 21 are telescoped one within the other to provide a closed space 24. Each of the casing members 17, 21 has integral square bosses 34a which extend into openings 34b in the plates 16, 20 (FIG. 4). Bosses 34a have threaded openings 34c through which screws 34d are threaded to fix the casing members 17, 21 on their respective plates 16, 20. A hinge pin 25 extends through an opening 26 in the outer casing member 17 and an opening 27 in the inner casing member 21. The pin 25 is press fitted in opening 26 in the casing member 17 and extends through an opening 31a in ratchet disc 31. A nut 29 and lock washer 30 are provided on the end of the pin 25. A spring clip 25a engages a groove 25b in pin 25 to maintain the casing members 17, 21 assembled prior to mounting on plates 16, 20.

Sheet metal ratchet disc 31 has an annular radially extending surface 32 and a peripheral flange 33 and is positioned within the space 24 with the flange portion 33 adjacent the inner surface of the flange portion 23 of second casing member 21. Pin 25 passes through opening 31a in disc 31.

As shown in FIG. 5, the inner surface of the portion 18 of outer casing member 17 is formed with diametrically opposed sets of teeth 35 which are struck or coined outwardly from the surface thereof. The arcuate extent of each set of teeth 35 corresponds substantially to the desired angular movement of the seat back 14 relative to the seat base 11. The complementary surface 32 of ratchet disc 31 is formed with opposed sets of teeth 36 that are complementary to the teeth 35 and are struck or coined outwardly from the surface of the portion 32. A compression spring 37 yieldingly urges the teeth 36 of the ratchet disc 31 into engagement with the teeth 35 of the casing member 17. As shown in FIG. 4, the ratchet disc 31 and the second casing member 21 include circumferentially extending raised portions 38a, 38b along the periphery of the flanges 33, 23 which interlock to prevent relative rotation between the ratchet disc and the casing member 21. A tab 39 on base plate 20 extends into a cut away portion of a flange 40 on casing member 17. The tab 39 engages the shoulders 41 thereby formed to limit the forward angular movement of the seat back in the case of four-door automobiles. In two-door applications, the tab 39 and shoulders 40 are eliminated.

Figure 6:
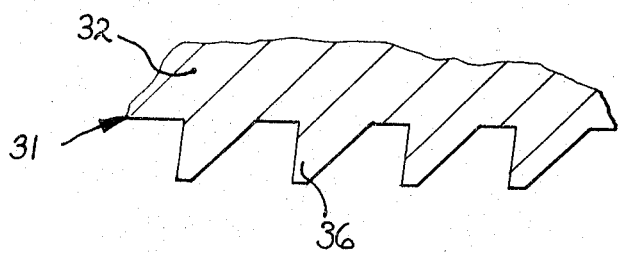
FIG. 6 is a fragmentary sectional view taken along the line 6—6 in FIG. 4.
Figure 7:
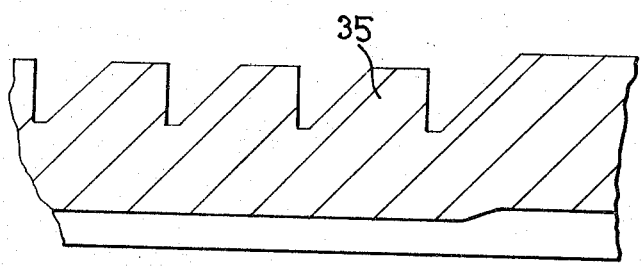
FIG. 7 is a fragmentary sectional view taken along the line 7—7 in FIG. 5.
Figure 8:
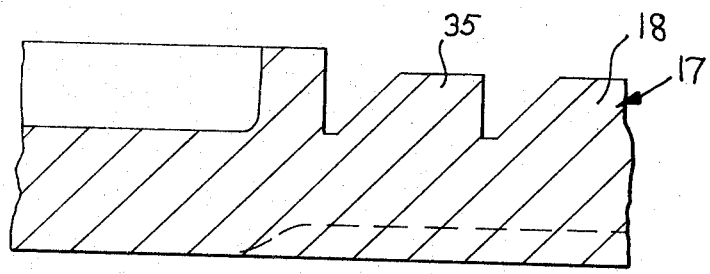
FIG. 8 is a fragmentary sectional view taken along the line 8—8 in FIG. 5.

As shown in FIG. 6, the teeth 35, 36 are unsymmetrical with one surface extending substantially radially and the other surface thereof inclined so that the seat will be locked in any inclined position but can be manually moved to the upright position, or into a completely folded position in the case of two-door automobiles, without releasing the latch plate. The radial surfaces of the teeth 35 on the seat back preferably have a back angle to insure proper locking (FIG. 6). As shown in FIGS. 5, 7 and 8, the outer sheet metal casing member 17 is formed with an extension or shoulder which serves to maintain the teeth 36 out of engagement and prevent any binding during the final forward folding in the case of a two-door automobile.

As shown in FIGS. 2 and 4, means are provided for moving the ratchet disc 31 away from the teeth 35 to permit angular adjustment of the seat back relative to the seat base and comprises an actuating plate 50 having axially extending circumferentially spaced fingers 51 that extend through openings 52 in the first disc 17 against a depressed portion 32a of portion 32 of the ratchet disc 31. A finger 51a extends through an opening 52a in pin 25 to guide the fingers 51. The plate 50 is operated by a solenoid S as shown in FIGS. 2–4 which upon energization causes a plunger 53 thereof to engage a pivoted lever 54 that in turn applies a force on the actuating plate 50 to move the pins 51 in a direction to move the ratchet disc 31 away from the teeth 35 on casing member 17. Instead of utilizing a solenoid, manual operation can be achieved by extending the length of lever 54 to form a handle. When this is done the portion of the mechanism is reversed so that the handle is on the outside of the seat.

In accordance with the invention, a spring is appropriately provided on the seat back that yieldingly urges the seat upwardly causing the teeth to move positively into interengagement.

Figure 9:
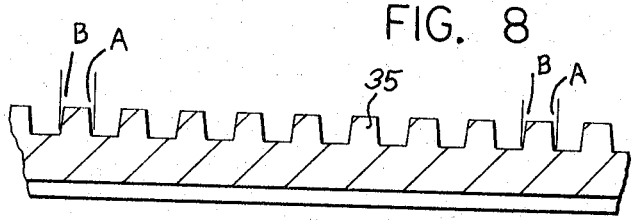
FIG. 9 is a fragmentary sectional view of a modified tooth structure.

In the form of the invention shown in FIG. 9, the teeth are symmetrical and have substantially flat top portions and inclined side portions, the degree or angle of inclination of the side portions varying along the length of the teeth so that the teeth at one extreme have a greater inclination than at the other. The angle A along the front side of the teeth remains constant in successive teeth. The angle B along the rear side of the teeth becomes progressively greater in those teeth which are engaged as the angle of the repose of the seat back increases rearwardly. The teeth on the ratchet disc 31 are of identical angles corresponding to the angles of the teeth which are engaged when the seat back is in upright position. By this arrangement, a positive locking is assured when the seat back is upright and a firm but easily releasable holding of the seat back is obtained when the seat back is in its greatest rearward or reclining position.

We claim:

1. In a reclining seat, the combination comprising a base, a back, means for hinging one end of said back to said base, and means at the other end of said back and said base for hinging and selectively controlling the position of the back relative to said base comprising
    a hollow casing fixed on one of said base and said back,
    a complementary casing member fixed on the other of said base and said back,
    said casing members being telescoped within one another to provide an enclosed space,
    one of said casing members having a plurality of circumferentially spaced teeth on an inner surface thereof,
    means for journalling said casing members on said base,
    a ratchet disc provided in said enclosed space and having a plurality of complementary teeth on a surface thereof engaging the teeth on said casing member,
    means interposed between the other said casing member and said ratchet disc yieldingly urging said ratchet disc toward said one casing member,
    and means externally of said casing for moving said ratchet disc away from said teeth on said casing member against the action of said yielding means.

2. The combination set forth in claim 1 wherein said teeth on said casing member and said ratchet disc are struck from one surface thereof,
    the opposed surfaces of said member and said disc being substantially smooth and undeformed.

3. The combination set forth in claim 1 including means yieldingly urging said back upwardly toward an upright position.

4. The combination set forth in claim 1 wherein said means for urging said ratchet disc away from said teeth of said casing comprises a solenoid,
    and means extending through said casing member and engaging said disc,
    said last-mentioned means being operated by said solenoid.

5. In a reclining seat, the combination comprising a base, a seat back, means for pivoting one end of said seat back to one end of said base, means for pivoting the other end of said seat back to said base and controlling the angular position of said seat back relative to said base comprising
    a first casing member fixed on said seat back and having a generally cylindrical peripheral flange,
    a second casing member fixed on said base and having a generally cylindrical peripheral flange,
    said flange of said second casing member being telescoped within said flange of said first casing member to provide a substantially enclosed space,
    means journalling said casing members and in turn said seat back on said base,
    a ratchet disc positioned within said enclosed space,
    said ratchet disc having a circumferential radial surface,
    said first casing member having a complementary circumferential radial surface,
    said surfaces having interengaging teeth,
    said ratchet disc having an axially extending flange engaging the inner surface of the flange on said second casing member,
    spring means interposed between said second casing member and said ratchet disc and yieldingly urging said ratchet disc in a direction to cause said teeth on said ratchet disc to engage the teeth on said first sealing member,
    and means mounted exteriorly of said casing members and extending through said first casing member against said ratchet disc and movable to force said ratchet disc away from said teeth on said sealing member against the action of said spring means.

6. The combination set forth in claim 5 wherein said teeth are struck outwardly from the surfaces of said first sealing member and said ratchet disc,
    said members and said disc being made of sheet metal.

7. The combination set forth in claim 5 including solenoid means for urging said ratchet disc away from said first casing member against the action of said spring means.

8. In a reclining seat, the combination comprising a base, a back, means for hinging one end of said back to said base, and means at the other end of said back and said base for hinging and selectively controlling the position of the back relative to said base comprising
    a hollow casing fixed on one of said base and said back,
    a complementary casing member fixed on the other of said base and said back,
    said casing members being telescoped within one another to provide an enclosed space,
    one of said casing members having a plurality of circumferentially spaced teeth on an inner surface thereof,
    means for journalling said casing members on said base,
    a ratchet disc provided in said enclosed space and having a plurality of complementary teeth on a surface thereof engaging the teeth on said casing member,
    said teeth being unsymmetrical in cross section,
    means interposed between the other said casing member and said ratchet disc yieldingly urging said ratchet disc toward said one casing member,
    means externally of said casing for moving said ratchet disc away from said teeth on said casing member against the action of said yielding means,
    and means yieldingly urging said back upwardly toward an upright position.

9. The combination set forth in claim 8 wherein said teeth on said casing member and said ratchet disc are struck from one surface thereof,
    the opposed surfaces of said member and said disc being substantially smooth and undeformed.

10. In a reclining seat, the combination comprising a base, a seat back, means for pivoting one end of said seat back to one end of said base, means for pivoting the other end of said seat back to said base and controlling the angular position of said seat back relative to said base comprising
    a first generally cylindrical casing member fixed on said seat back and having a generally cylindrical peripheral flange,
    a second generally cylindrical casing member fixed on said base and having a generally cylindrical peripheral flange,
    said flange of said second casing member being telescoped within said flange of said first casing member to provide a substantially enclosed space,
    means journalling said casing members and in turn said seat back on said base,
    a ratchet disc positioned within said enclosed space,
    said ratchet disc having a circumferential radial surface,
    said first casing member having a complementary circumferential radial surface,
    said surfaces having interengaging teeth,
    said teeth being unsymmetrical in cross section,
    said ratchet disc having an axially extending flange engaging the inner surface of the flange on said second casing disc, spring means interposed between said second casing member and said ratchet disc and yieldingly urging said ratchet disc in a direction to cause said teeth on said ratchet disc to engage the teeth on said first sealing member, and means mounted exteriorly of said casing members and extending through said first casing member against said ratchet disc and movable to force said ratchet disc away from said teeth on said sealing member against the action of said spring means.

11. The combination set forth in claim 10 wherein said teeth are struck outwardly from the surfaces of said first casing member and said ratchet disc, said members and said disc being made of sheet metal.

12. The combination set forth in claim 10 including arcuate extensions adjacent the endmost teeth on said first casing member extending axially such that said extensions are engaged by the teeth on said ratchet disc when the relative positions of said first casing member and said ratchet disc change such that the teeth on the ratchet disc move out of engagement with the teeth on the first casing member.

13. The combination set forth in claim 10 wherein the included angle of the teeth on the ratchet disc is substantially constant and the included angle of the teeth on said first casing member increases progressively from the teeth which are in engagement when the seat back is upright toward the teeth which are in engagement when the seat back is in reclining position.

References Cited

UNITED STATES PATENTS

| | | | |
|---|---|---|---|
| 2,784,770 | 3/1957 | Herr | 297—367 |
| 3,048,883 | 8/1962 | Rizzuto | 16—144 |
| 3,099,485 | 7/1963 | Beirbach et al. | 297—373 |
| 3,156,004 | 11/1964 | Strien et al. | 16—146 |
| 3,271,811 | 9/1966 | Flodell | 16—140 |

CASMIR A. NUNBERG, *Primary Examiner.*